United States Patent
Ling et al.

(10) Patent No.: US 6,892,284 B2
(45) Date of Patent: May 10, 2005

(54) DYNAMIC MEMORY ALLOCATION FOR ASSIGNING PARTITIONS TO A LOGICAL PORT FROM TWO GROUPS OF UN-ASSIGNED PARTITIONS BASED ON TWO THRESHOLD VALUES

(75) Inventors: Jing Ling, Fremont, CA (US); Juan-Carlos Calderon, Fremont, CA (US); Jean-Michel Caia, San Francisco, CA (US); Vivek Joshi, Sunnyvale, CA (US); Anguo T. Huang, Mountain View, CA (US); Steve J. Clohset, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 427 days.

(21) Appl. No.: 10/242,580

(22) Filed: Sep. 11, 2002

(65) Prior Publication Data

US 2004/0049650 A1 Mar. 11, 2004

(51) Int. Cl.[7] .............................................. G06F 12/02
(52) U.S. Cl. ........................ 711/153; 711/170; 711/171; 711/172; 711/173; 710/52; 710/56; 710/57; 707/205; 707/206
(58) Field of Search ........................ 711/153, 170–173; 710/52, 56–57; 707/205–206

(56) References Cited

U.S. PATENT DOCUMENTS

| | | | | |
|---|---|---|---|---|
| 4,920,487 A | * | 4/1990 | Baffes ........................ | 718/105 |
| 5,706,472 A | * | 1/1998 | Ruff et al. .................. | 711/173 |
| 6,088,777 A | * | 7/2000 | Sorber ........................ | 711/171 |
| 6,449,705 B1 | * | 9/2002 | Peloquin et al. ............ | 711/173 |
| 6,745,312 B1 | * | 6/2004 | Schnee et al. .............. | 711/173 |
| 2003/0158884 A1 | * | 8/2003 | Alford, Jr. .................. | 709/104 |

\* cited by examiner

*Primary Examiner*—Matthew Kim
*Assistant Examiner*—Hetul Patel
(74) *Attorney, Agent, or Firm*—David N. Tran

(57) ABSTRACT

A memory is divided into a number of partitions. The partitions are grouped into a first group of partitions and a second group of partitions. When required by a port, a partition is assigned to the port from a pool of un-assigned partitions. The pool of un-assigned partitions comprises of un-assigned partitions from the first group of partitions and un-assigned partitions from the second group of partitions. The un-assigned partitions from the first group of partitions are assigned to the port until a first threshold is reached. The un-assigned partitions from the second group of partitions are assigned to the port after the first threshold is reached. A second threshold is used to limit a total number of partitions assigned to the port.

23 Claims, 11 Drawing Sheets

DYNAMIC MEMORY ALLOCATION FOR ASSIGNING PARTITIONS TO A LOGICAL PORT FROM TWO GROUPS OF UN-ASSIGNED PARTITIONS BASED ON TWO THRESHOLD VALUES

FIELD OF THE INVENTION

The present invention relates to the field of communication networks, more particularly relating to data buffering.

BACKGROUND

A network may include a plurality of interconnected systems or nodes, and may comprise, for example, without limitation, computers, set top boxes, peripherals, servers and/or terminals coupled by communications lines or other communications channels. A network may connect or couple systems over a local area (e.g., a campus) or over a wide area (e.g., multiple campuses).

High-speed packet-switching networks, such as Asynchronous Transfer Mode (ATM), Internet Protocol (IP), and Gigabit Ethernet, support a multitude of connections to different sessions. Typically, packet-switching systems are employed to transmit blocks of data, called packets. The packets may have fixed size or they may have variable sizes. Each packet may include control information in a header. The control information may include routing information to route the packet through the network to a destination, and information to indicate a start of a packet and an end of the packet. The control information may also include information to indicate whether a packet is a last packet (or tail packet).

Many systems (e.g., framers, network processors, etc.) implement packet-based interfaces. For example, the interface may be the ATM Forum's Universal Test & Operations Physical Interface for ATM (UTOPIA) or Optical Internetworking Forum (OIF)'s System Packet Interface (SPI-3 and SPI-4). FIG. 1A is a block diagram illustrating an example of an interface. The interface 110 may be, for example, an UTOPIA interface. The interface 110 may also be, for example, an SPI interface. ATM data may be exchanged between the physical layer 105 and the ATM layer 115 through the interface 110. The interface 110 may include components to interface with the physical layer 105 and components to interface with the ATM layer 115. These components may include FIFO (first-in first-out) controllers that handle reading from and writing to FIFO buffers in a memory. There may be multiple physical devices in the physical layer 105, and there may be multiple ATM devices in the ATM layer 115. There may be one FIFO controller for each of the physical and ATM devices. The interface 110 may also include other components. The FIFO controller is typically implemented across two clock domains—a clock domain for the interface and a clock domain for the corresponding device.

FIG. 1B is a block diagram illustrating an example of a prior art partitioning of a physical memory. Typically, memory 100 is divided into equal fixed-size partitions with each of the partitions used as a FIFO buffer and assigned to a logical port. Each logical port may be associated with a device (e.g., ATM device). For example, the size of the memory 100 may be 16 Kbytes, and the memory 100 may be divided into 64 partitions. Each of the 64 partitions may be statically assigned to a logical port (e.g., the partition 1 is assigned to the logical port 1, etc.) such that every logical port is associated with at most one partition. There is no free partition. In this example, each partition is 256 bytes long. This partitioning technique is referred to as complete partitioning (CP). When using CP, memory space in a partition may be wasted if the associated assigned logical port is inactive. The wasted memory space cannot be used by another active logical port. Thus, while one active logical port may experience packet overflow, there may be one or more inactive logical ports that may not fully utilize their FIFO buffers.

In another prior art, an arriving packet is accepted into the memory if there is any available memory space regardless of how much memory space the associated logical port is utilizing. For example, there may be multiple FIFO buffers each having different sizes. When there is no available memory space, an arriving packet is dropped. When a logical port is utilizing memory space and the data stored in the memory space is not read, that logical port may monopolize the memory space it is utilizing leaving little left for the other logical ports. This technique is referred to as complete sharing (CS). When using CS, a heavily utilized logical port punishes a lightly utilized logical port.

The allocation of memory space to FIFO buffers is made worse by the emerging standards ANSI T1.105–2001 (Synchronous Optical Network (SONET)) that describes virtual bandwidth allocation and allows each logical port to transfer at a dynamically changing rate.

BRIEF DESCRIPTION OF THE DRAWINGS

Subject matter is particularly pointed out and distinctly claimed in the concluding portion of the specification. The subject matter, however, both as to organization and method of operation, together with objects, features, and advantage thereof, may best be understood by reference of the following detailed description when read with the accompanying drawings in which:

DETAILED DESCRIPTION

In accordance with one embodiment of the present invention, a memory in an interface is divided into multiple partitions. When memory space is required, a logical port may be assigned one or more partitions from a free pool of partitions. When a partition is not needed, it is returned to the free pool.

Figure 2A:
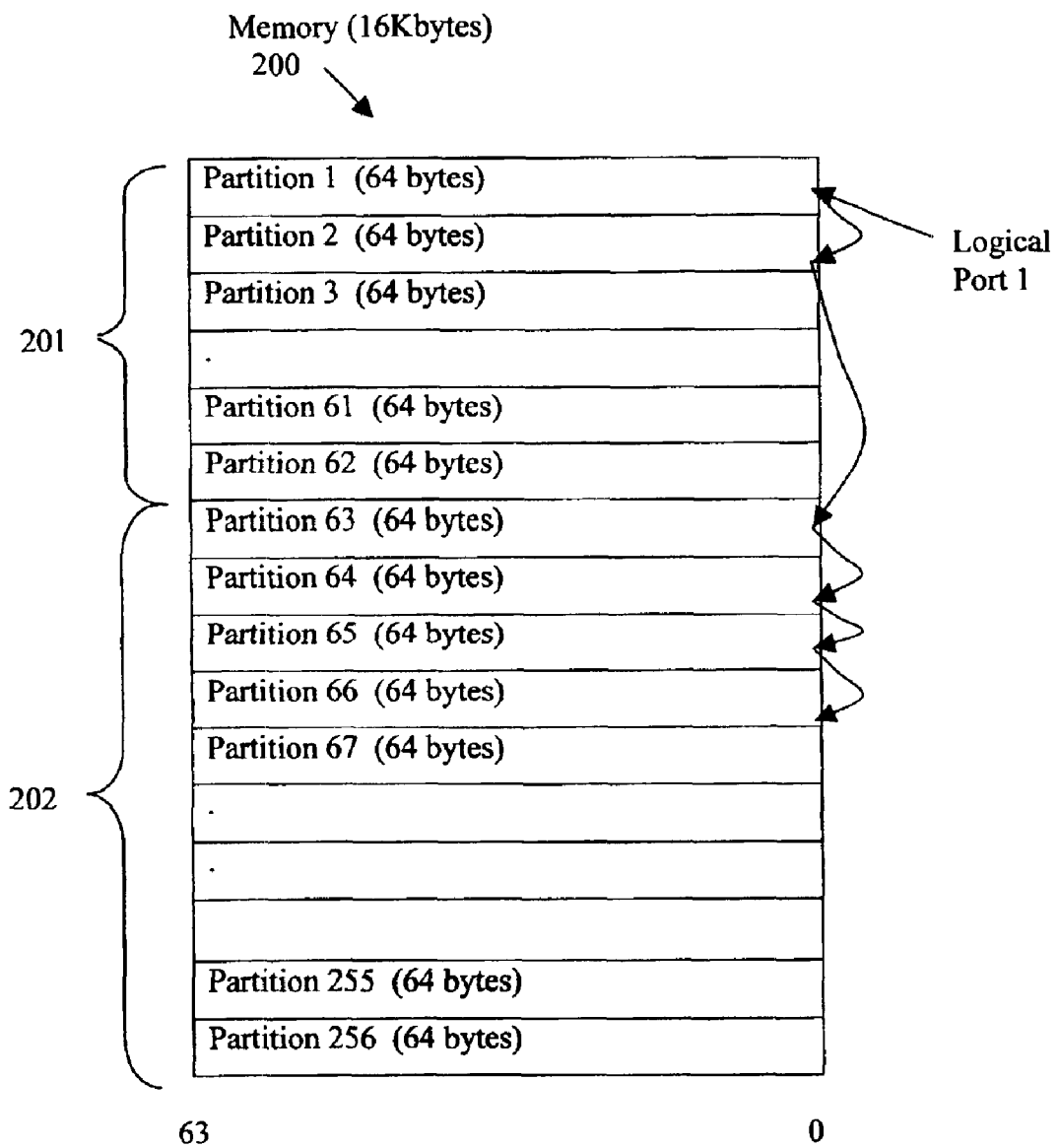
FIG. 2A is a block diagram illustrating an example of a memory in accordance with one embodiment of the present invention.

FIG. 2A is a block diagram illustrating an example of a memory and its partitions. Memory 200 may be partitioned into multiple partitions. The number of partitions may be at least equal to the number of supported logical ports. The partitions may have the same size. For example, the size of the memory 200 may be 16 Kb, and the memory 200 may be partitioned into 256 equal-sized partitions, even though there may only be 64 logical ports.

For one embodiment, the partitions may be grouped into two virtual or logical groups, a dedicated group and a shared group. For example, referring to the example illustrated in FIG. 2A, there may be 62 partitions in the dedicated group 201 and 196 partitions in the shared group 202. For one embodiment, the grouping of the partitions described here relates to the number of partitions in each group and not limited to the physical grouping of the partitions by their memory addresses, even though the physical addresses of the partitions remain the same. For example, although the partition 1 and the partition 2 illustrated in FIG. 2A as belonging to the dedicated group 201, the partition 1 may be physically located at an address toward the beginning of the memory 200 and the partition 2 may be physically located at an address toward the end of the memory 200. Thus, the partitions 1–256 in the current example may not all be at contiguous addresses.

Each logical port is associated with a FIFO buffer. Each FIFO buffer may span multiple partitions assigned to that logical port. The multiple partitions may or may not be contiguous. The size of the FIFO buffer may be dynamic. For example, the size of a FIFO buffer may increase when more partitions are assigned to the logical port. Similarly, the size of the FIFO buffer may decrease when the logical port no longer needs the assigned partitions.

For one embodiment, a threshold is used to determine the number of partitions from the dedicated group 201 that may be assigned to a logical port. This threshold may be referred to as a first threshold. For example, a logical port may get at most two (2) partitions from the dedicated group 201. For another embodiment, one partition from the dedicated group 201 may be reserved for each logical port even though the logical port may not be active. A logical port is active when there is data to be read from its associated FIFO buffer.

For one embodiment, when a logical port needs more partitions than specified by the first threshold, the additional partitions may be assigned from the shared group 202. For example, the logical port 1 illustrated in FIG. 2A is assigned two partitions from the dedicated group 201 and four partitions from the shared group 202. Although the memory 200 is illustrated to be at 16 Kbytes and the number of partitions is illustrated to be at 256, one skilled in the art would recognize that the embodiment is not limited to these sizes and that other memory sizes, partition sizes and correspondingly the number of partitions may also be used.

Figure 2B:
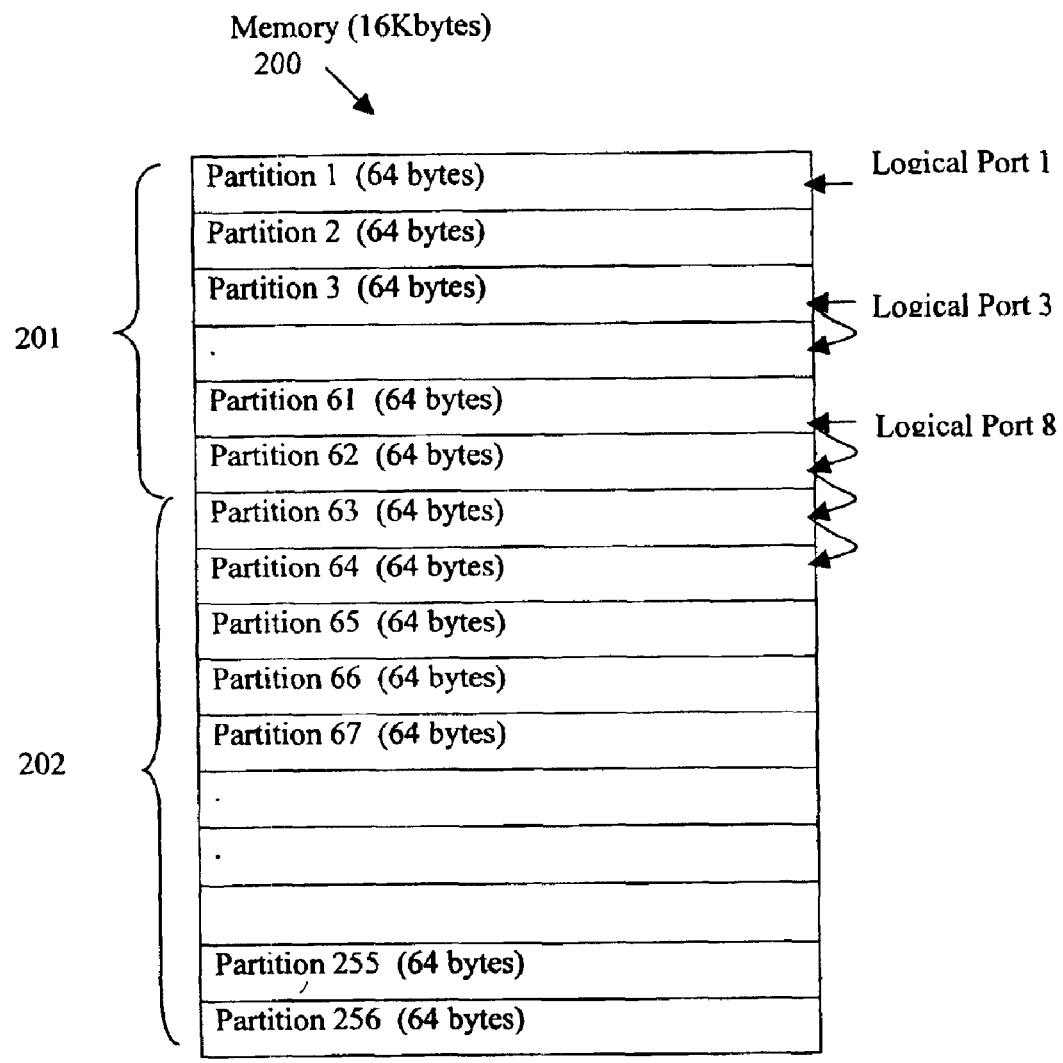
FIG. 2B is a block diagram illustrating another example of a memory in accordance with one embodiment of the present invention.

FIG. 2B is a block diagram illustrating another example of a memory and its partitions. In this example, there are three logical ports 1, 3 and 8, each having been assigned at least one partition from the dedicated group 201. These may be considered active ports because there each have assigned partitions and there may be data in these partitions that need to be read. Correspondingly, there may be one or more inactive ports. No partitions may be assigned to inactive ports. Alternatively, in the embodiment where one partition is reserved for each logical port, the inactive ports may have at most one partition, which may not include any data to be read.

Referring to FIG. 2B and using the dedicated group threshold example described above, the two partitions assigned to the logical port 3 are from the dedicated group 201. However, of the four logical ports assigned to the logical port 8, the first two are assigned from the dedicated group 201, and the next two are assigned from the shared group 202. For one embodiment, another threshold (or second threshold) may be used to limit a total number of partitions assigned to a logical port. It may be possible that, at a certain time, all of the partitions in the dedicated group 201 or in the shared group 202 may be assigned to the logical ports.

For one embodiment, the total number of partitions assigned to a logical port (or included in an associated FIFO buffer) is kept track of. When the logical port does not need a partition, that partition is returned and the total number of partitions assigned to that logical port is reduced by one. The resulting number of assigned partitions to the logical port may then be compared with the dedicated group threshold (or first threshold). If it is above the dedicated group threshold, then the partition is returned to the shared group 202; otherwise, the partition is returned to the dedicated group 201. For one embodiment, a partition is returned by the logical port in the reverse order of when it was assigned in comparison with the other partitions. For example, the partition 61 in FIG. 2B is the first partition assigned to the logical port 8 and will be the first partition un-assigned from the port.

Figure 2C:
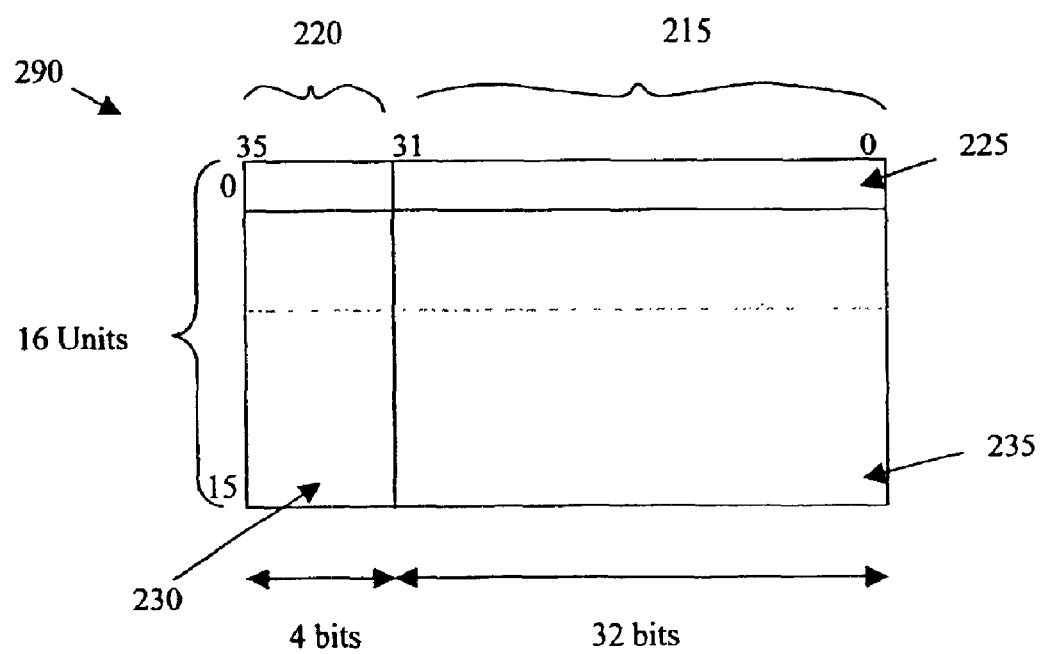
FIG. 2C is a block diagram illustrating an example of a partition in accordance with one embodiment of the present invention.

FIG. 2C is a block diagram illustrating an example of a partition. For one embodiment, a partition may include a data section to store user data and a control section to store control information. For example, partition 290 may include a data section 215 that includes user data. The data section 215 may be divided into multiple data units (e.g., data words) to store sections of the user data. For example, the data section 215 in the partition 290 may be divided into 16 data units, each 32 bits long (one word or four bytes). The 32-bits wide data unit may be convenient when using an interface having 8 bits or 16 bits data bus width. In addition, the 32-bits wide data unit may allow each byte to be updated independently.

The partition 290 may also include a control section 220. The control section 220 may also be divided into multiple control units so that there is one control unit for each data unit. Each control unit may include control information about the data in the associated data unit. For example, the last control unit 230 (bits 32–35) of the control section 220 includes control information about the data in the last data unit 235 (bits 0–31) of the data section 215. The control information about the data may include, for example, start of packet, end of packet, error condition, etc. The following table (referred to as Table 1) illustrates an example of possible values of the four bits (bit 32–35) of a control unit.

| Bit | Value = 0 | Value = 1 |
| --- | --- | --- |
| 35 | Not end of a packet | End of a packet |
| 34 | Middle of a packet | Start of a packet |
| 32–33 | Reserved | Number of bytes used |

In this example, bit 35 of the control unit is used to indicate whether the data contained in the associated data unit includes an end of packet indicator (value=1) or does not include an end of packet indicator (value=0). Bit 34 is used to indicate whether the data contained in the associated data unit includes a start of packet indicator (value=1) or includes a middle of packet indicator (value=0). When bit 35 indicates that the end of the packet indicator is included in the associated data unit, bits 32 and 33 are used to indicate an amount of data (e.g., a number of bytes) contained in the associated data unit. This is because the last data unit may not be completely used.

For one embodiment, each partition may include a pointer that points to a next partition (referred to as a next partition pointer) in the FIFO buffer. For example, the first data unit 225 of the partition 290 may include a next partition pointer. The next partition pointer may be used to link one partition to another partition when the FIFO buffer includes more than one partition. When a partition is a last or only partition in the FIFO buffer, the next partition pointer of that partition may have a null value. For one embodiment, the next partition pointer may be stored in a separate memory leaving more memory space in the partition 290 for storing data.

Figure 2D:
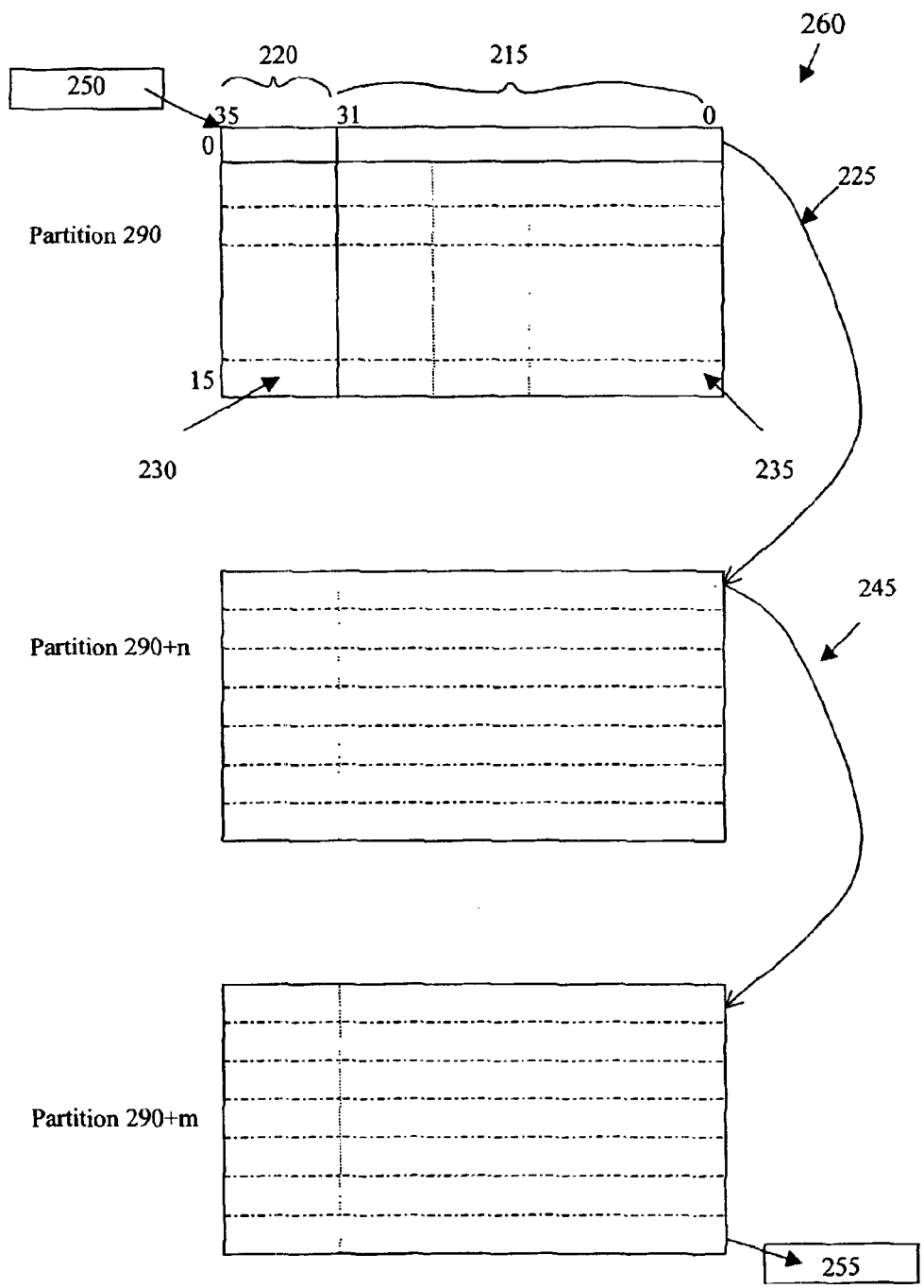
FIG. 2D is a block diagram illustrating an example of a FIFO buffer that includes more than one partition in accordance with one embodiment of the present invention.

FIG. 2D is a block diagram illustrating an example of a FIFO buffer that includes more than one partition in accordance with one embodiment. FIFO buffer 260 in this example includes three partitions, partition 290, partition 290+n, and partition 290+m. These partitions may or may not be contiguous and may be in any physical order. The partition 290 is linked to the partition 290+n using the next partition pointer 225. The partition 290+n is linked to the partition 290+m using the next partition pointer 245. The next partition pointer of the partition 290+m may have a null value to indicate that there is no other partition in the FIFO buffer 260.

The FIFO buffer 260 may be associated with a head pointer 250 and a tail pointer 255. The head pointer 250 may point to the beginning of the data, which in this example may be in the first partition 290 of the FIFO buffer 260. The tail pointer 255 may point to the end of the data, which in this example may be in the last partition 290+m of the FIFO buffer 260. As the data is read from the FIFO buffer 260, the head pointer 250 may be updated accordingly. When the data is completely read from the partition 290, the head pointer 250 may then be updated to point to the beginning of the data in the partition 290+n. This may be done using the next partition pointer 225 to locate the partition 290+n. The partition 290 may then be returned.

Referring to FIG. 2B, there may be partitions in the dedicated group 201 and/or in the shared group 202 that have not been assigned to any logical port. These partitions are considered free or available partitions and may logically be grouped together in a free pool. For example, when a logical port returns a partition to either the shared group 202 or the dedicated group 201, it may be logically be viewed as being returned to the free pool.

Figure 3A:
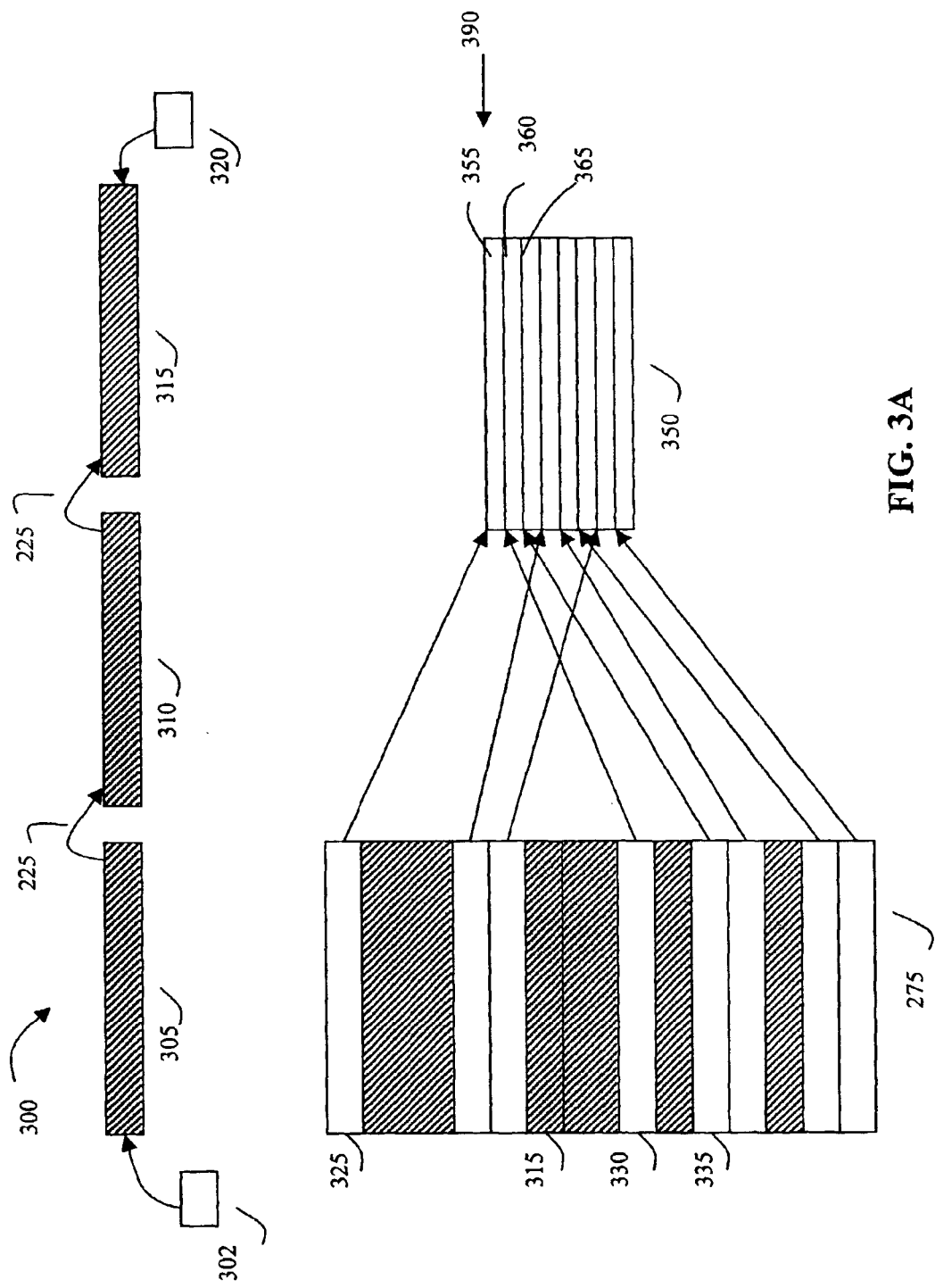
FIG. 3A is a block diagram illustrating an example of a free pool and a free pointer stack used to assign one or more partitions to a FIFO buffer in accordance to one embodiment of the invention.

FIG. 3A is a block diagram illustrating an example of assigning a partition from a free pool. In this example, memory 275 includes assigned partitions (not free) and non-assigned partitions (free). The free partitions include partitions 325, 330, 335 and other non-shaded partitions. The non-free partitions (e.g., shaded partition 315 and other shaded partitions) have been assigned and are included in one or more FIFO buffers. These shaded partitions are not available to be assigned until they are returned by the appropriate logical ports.

For one embodiment, information about the partitions in the free pool is kept so that when a logical port needs an additional partition, a partition from the free pool may be located. As described above, the number of free partitions in the free pool may vary, and the partitions in the free pool may or may not be physically contiguous. A free pool start pointer and a free pool end pointer may be used to indicate the beginning and the end of the free pool. A free pool pointer may be used to indicate the input/output position of the stack. For one embodiment, the addresses of the partitions in the free pool may be stored in another memory as a stack. For example, referring to FIG. 3A, address 355 is a memory address for the beginning of the free partition 325. Similarly, address 360 is the memory address for the beginning of the partition 330, and address 365 is the memory address for the beginning of the free partition 335, and so on. These addresses are placed in the stack 350, and the free pool pointer 390 points to the address at the top of the stack 350.

Referring to FIG. 3A, the FIFO buffer 300 includes three partitions 305, 310 and 315. When the logical port associated with the FIFO buffer 300 requires more memory space, the free pool pointer 390 is used to identify the address 355 located at the top of the stack 350. The address 355 is then used to locate the free partition 325. For example, the address 355 may be the beginning address of the partition 325. The free partition 325 may then be assigned to the logical port and as a result be added to the FIFO buffer 300. The address 355 may then be removed from the top of the stack 350. This leaves the address 360 at the top of the stack 350. This also removes the partition 325 from being available so that it cannot be assigned to another logical port. Similarly, when the logical port associated with the FIFO buffer 300 requires even more memory space, the address 360 is removed from the top of the stack 350. The free partition 330 is located and added to the FIFO buffer 300. This leaves the address 365 at the top of the stack 350. This also removes the partition 330 from being available. Thus, these addresses are removed from the stack 350 on a last-in first-out (LIFO) basis. As additional data is written to the newly added partition, the tail pointer 320 of the FIFO buffer 300 may then be updated accordingly. The total number of partitions assigned to a logical port at any one time may be limited by a predetermined threshold. When a partition is assigned to a logical port, the control unit associated with the last data unit of the last partition in the FIFO buffer may need to be updated to indicate, for example, the end of the user data, as described in Table 1.

When reading the data from the FIFO buffer, the data may be read from the first partition of the FIFO buffer. The beginning of the data in the first partition may be located using the head pointer of the FIFO buffer. The data may be read from the FIFO buffer until a predetermined amount of data is reached. Alternatively, the data may be read until an end of data indicator is encountered. The end of data indicator is specified in the appropriate control unit, as described in Table 1. As data is read from the FIFO buffer, the head pointer is updated accordingly. When the FIFO buffer includes only one partition, the head pointer and the tail pointer may point to the same partition.

Figure 3B:
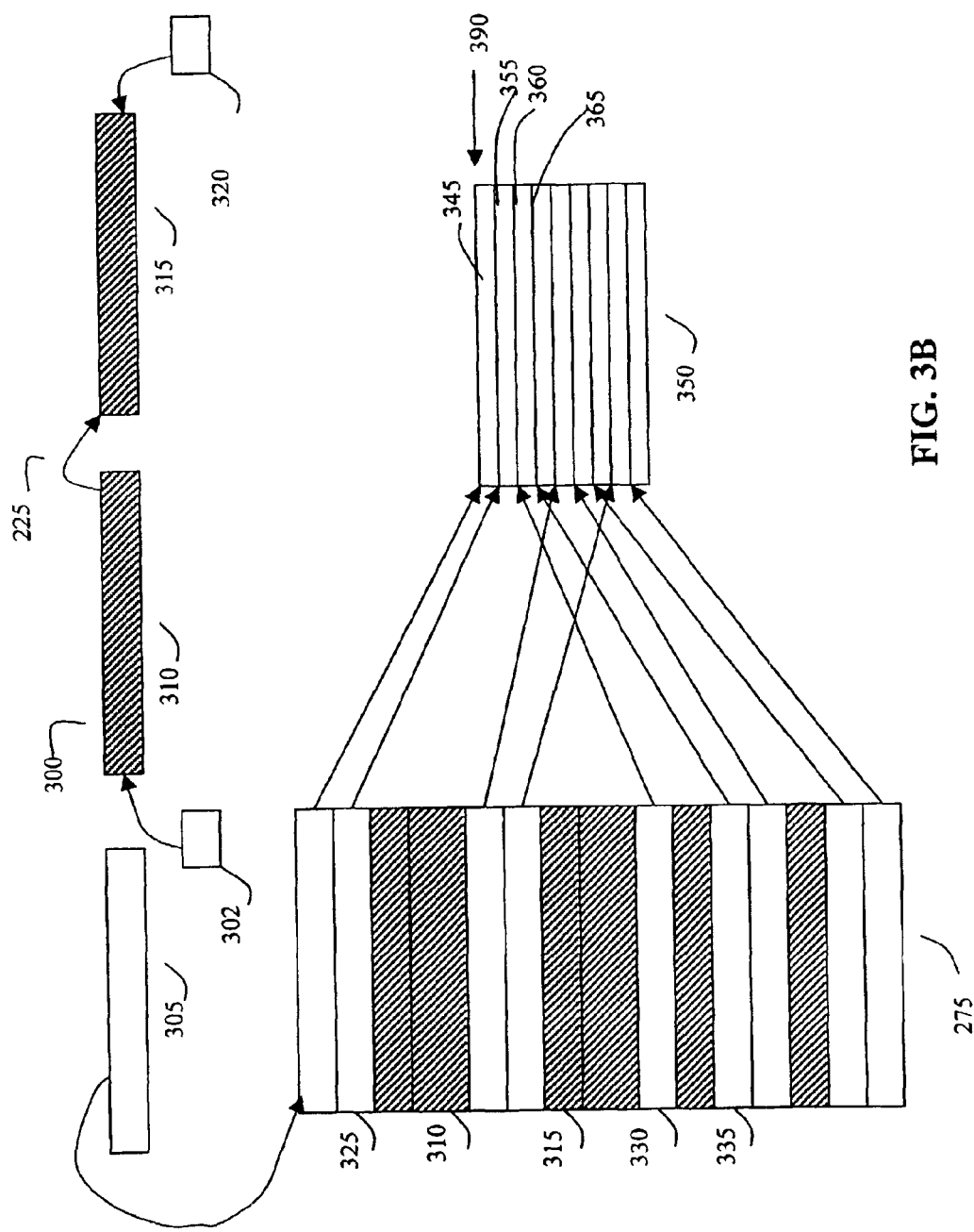
FIG. 3B is a block diagram illustrating an example of returning a partition from a FIFO buffer to the free pool in accordance to one embodiment of the invention.

FIG. 3B is a block diagram illustrating an example of returning a partition from a FIFO buffer. For one embodiment, when a partition in a FIFO buffer is not needed (e.g., data from the partition has been read), that partition may become a free partition and may be placed back into the free pool. This may include, for example, un-assigning the partition from the logical port. Referring to FIG. 3B, when the partition 305 of the FIFO buffer 300 is not needed, its associated address 345 may be placed onto the top of the stack 350. The free partition pointer 390 may be updated to point to the address 345 (or to the top of the stack 350). The partition 305 then becomes a free partition. In this example, the partition 305 is illustrated as a non-shaded partition at the top of the memory 275 to indicate its status as being free and available to be assigned. Also, when the address 345 is placed onto the top of the stack 350, it becomes the next available address. The next time a free partition is required by a logical port, the partition 305 is assigned.

For one embodiment, the methods described herein may be implemented across two clock domains. Referring to FIG. 2D, the tail pointer 255 in may be passed to the other clock domain whenever possible. Comparison between the head pointer 250 and the tail pointer 255 may be done in the clock domain where the head pointer 250 is in.

Figure 1A:
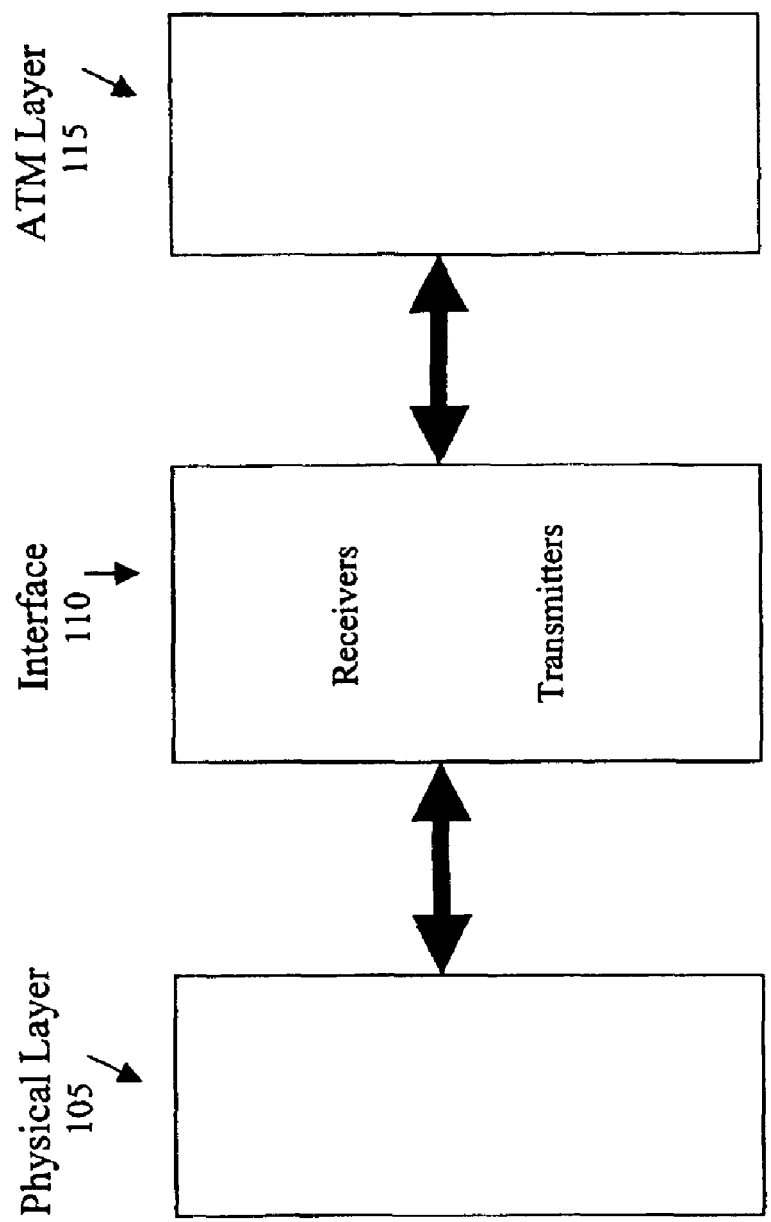
FIG. 1A is a block diagram illustrating an example of an interface.
Figure 1B:
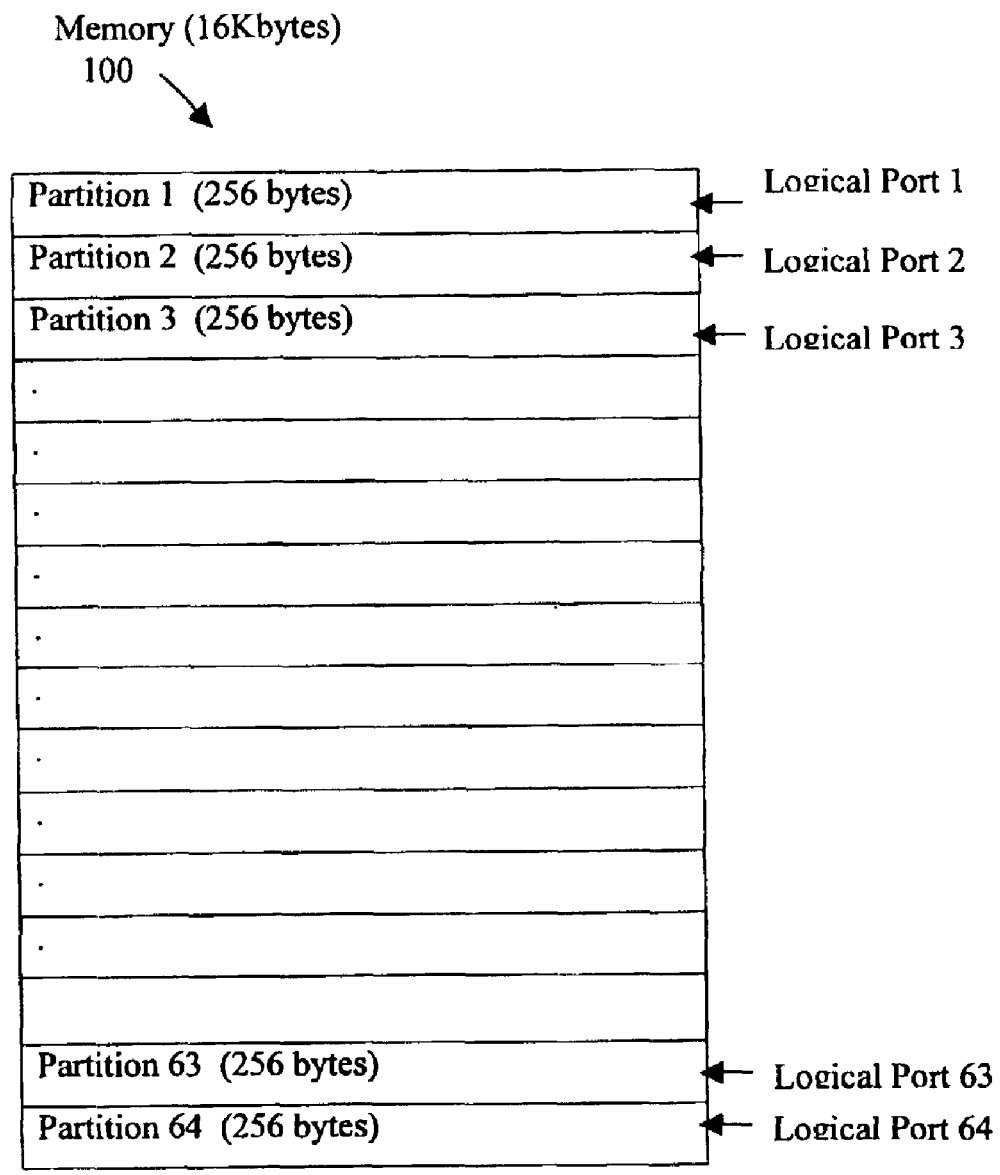
FIG. 1B is a block diagram illustrating an example of a prior art partitioning of a physical memory.

For another embodiment, a rate adaptation FIFO may be implemented in the interface 110 (illustrated in FIG. 1A) to enable the methods described herein to work in one clock domain. The rate adaptation FIFO is implemented in the device's internal system clock domain. For example, the device may be an ATM device. This is a FIFO with only one channel. In one direction, the rate adaptation FIFO may take data from the FIFO controller implemented using the method described above and send the data to the internal of the device in their arrival order. In the other direction, the rate adaptation FIFO may take data from the internal of the device and send the data to the FIFO controller implemented using the method described above in an arrival order.

Figure 4:
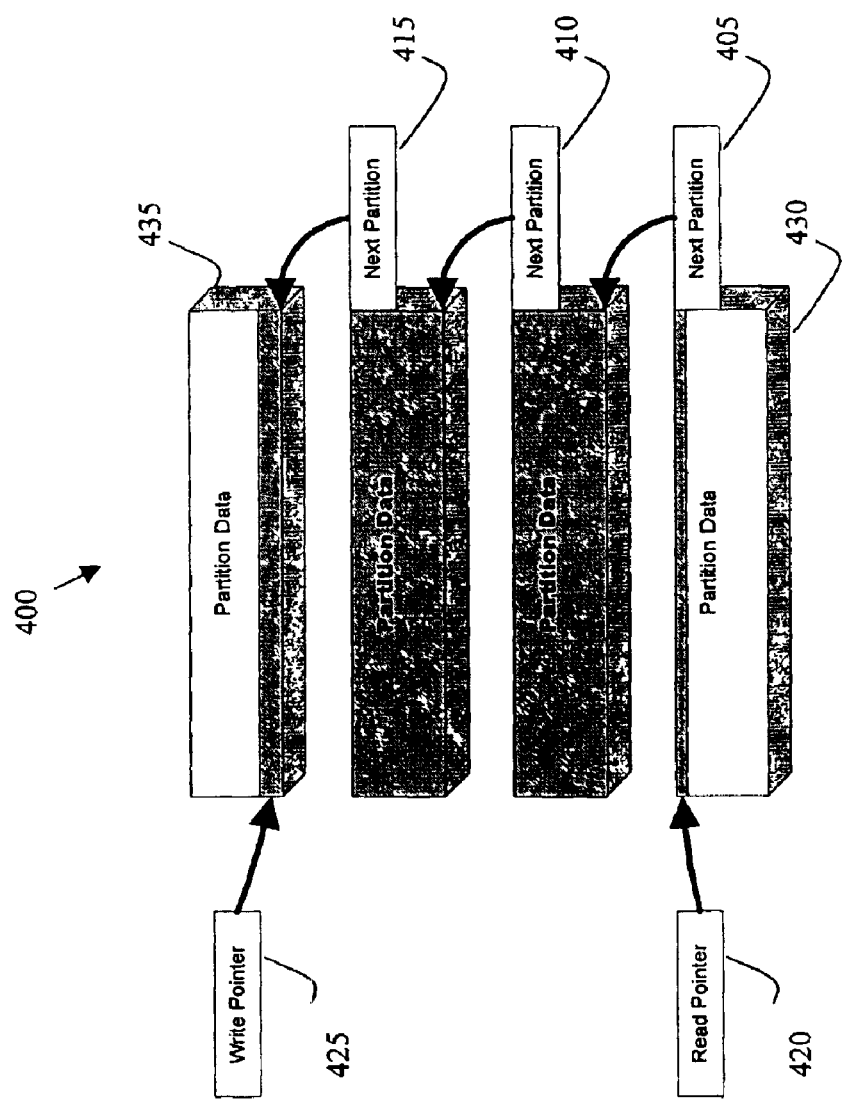
FIG. 4 is a block diagram illustrating an example of writing data into a FIFO buffer and reading data from the FIFO buffer.

FIG. 4 is a block diagram illustrating an example of writing data into a FIFO buffer and reading data from the FIFO buffer. As described above, a FIFO controller associated with the logical port writes data into the FIFO buffer and reads from the FIFO buffer. The FIFO buffer 400 in this example includes four partitions linked to one another in a link list. For example, the partition 430 (or the first partition in the FIFO buffer 400) is linked to the next partition using the next partition pointer 405. Similarly, the partition 435 (or the last partition in the FIFO buffer 400) is pointed to from a previous partition by the next partition pointer 415. For one embodiment, data may be written into the FIFO buffer 400 at a location pointed to by the write pointer (or tail pointer) 425, and data may be read from the FIFO buffer 400 at a location pointed to by the read pointer (or head pointer) 420. For example, the write pointer 425 may point to the next available space in the FIFO buffer 400 to write data. When the write pointer 425 moves closer to the end of the partition 435, a new partition from the free pool may be assigned to the logical port associated with the FIFO buffer 400. Then, after writing data into the last data unit of the partition (as described in FIG. 2B), the write pointer 425 may jump to the starting address of the newly assigned partition.

The read pointer 420 works in the same manner as the write pointer 425, but instead points to the portion of the data in the partition 430 that has not been read. After the last data unit in the partition 430 is read, the read pointer 420 jumps to the next partition in the FIFO buffer 400 pointed to by the next partition pointer 405. The logical port associated with the FIFO buffer 400 then returns the partition 430 to the free pool.

Figure 5:
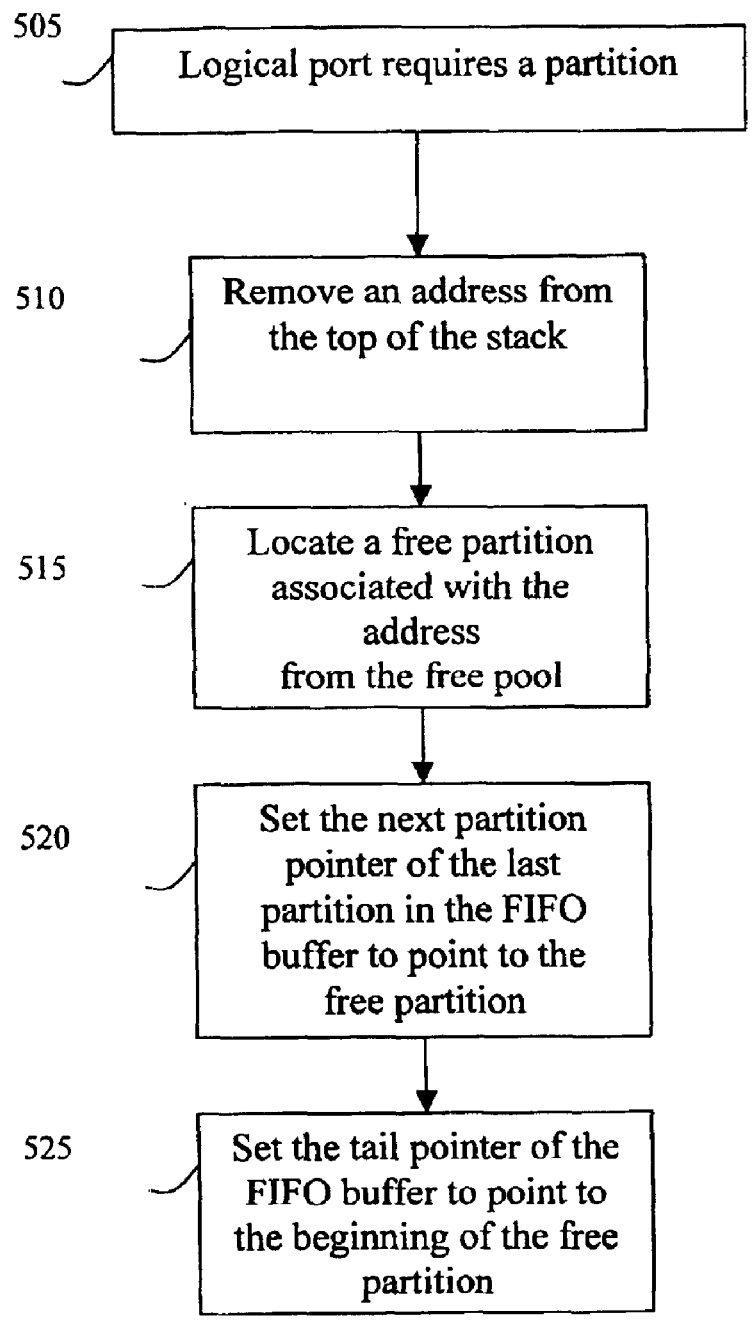
FIG. 5 is a flow diagram illustrating an example of a process of adding a partition to a FIFO buffer.

FIG. 5 is a flow diagram illustrating an example of a process of adding a partition to a FIFO buffer. The process may be used to assign a free partition from a free pool to a logical port that requires additional memory space for its FIFO buffer. At block 505, the logical port indicates additional memory space is required. At block 510, an address is removed from the top of the stack. Based on the address, a free partition is located in the free pool, as shown in block 515. At blocks 520, the next partition pointer of the last partition of the FIFO buffer is adjusted to point to the newly assigned partition, and the newly assigned partition now becomes the last partition of the FIFO buffer. At block 525, the tail pointer (or write pointer) may be updated to point to the beginning of the newly assigned partition. For example, the tail pointer may be updated to point to a first data unit of the newly assigned partition where data can continue to be written into the FIFO buffer.

Figure 6:
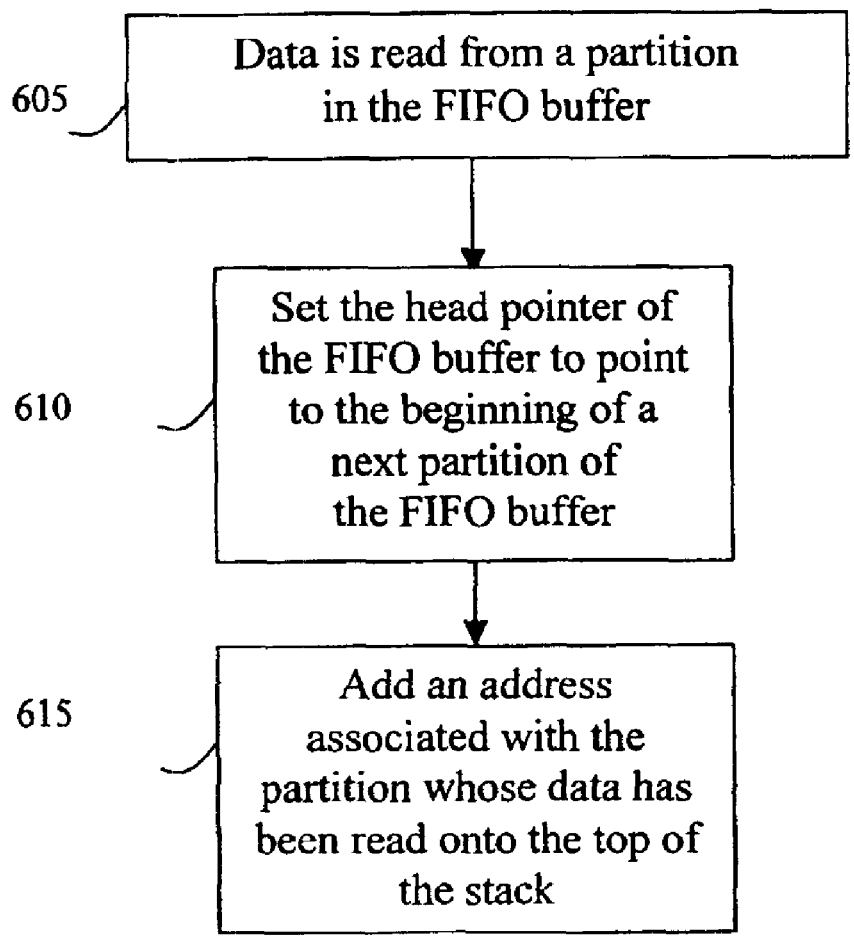
FIG. 6 is a flow diagram illustrating an example of a process of removing a partition from a FIFO buffer.

FIG. 6 is a flow diagram illustrating an example of a process of removing a partition from a FIFO buffer. The process may be used to remove a partition from a FIFO buffer that has more than one partition. The partition being removed may not be needed by the FIFO buffer after the data in that partition has been read. The partition may be placed into the free pool so that the partition may be assigned to other logical ports. At block 605, data is completely read from a first partition of the FIFO buffer. At block 610, the head pointer (or read pointer) of the FIFO buffer is set to point to the beginning of a next partition in the FIFO buffer. As described above, the beginning of the next partition may be located using the next partition pointer associated with the currently first partition of the FIFO buffer. The currently first partition of the FIFO buffer becomes a free partition, and the next partition becomes the new first partition of the FIFO buffer. At block 615, an address associated with the new free partition is placed onto the top of the stack (as described in FIG. 3B).

The operations of these various methods may be implemented by a processor in a computer system, which executes sequences of computer program instructions which are stored in a memory which may be considered to be a machine-readable storage media. The computer system may be an interface such as, for example, the UTOPIA interface 110 illustrated in FIG. 1A. The memory may be random access memory (RAM), read only memory (ROM), a persistent storage memory, such as mass storage device or any combination of these devices. Execution of the sequences of instruction causes the processor to perform operations according to one embodiment the present invention such as, for example, the operations described in FIG. 5 and FIG. 6.

In the preceding description, various aspects of the claimed subject matter have been described. For purposes of explanation, specific numbers, systems and configurations were set forth in order to provide a thorough understanding of the claimed subject matter. For example, although the description may refer to UTOPIA interfaces, the techniques described may also be used with other interfaces such as, for example, the Optical Internetworking Forum's System Packet Interface (SPI). It would be then apparent to one skilled in the art having the benefit of this disclosure that the claimed subject matter may be practiced without the specific details. In other instances, well-known features were omitted or simplified in order not to obscure the claimed subject matter.

What is claimed is:

1. A method, comprising:

dividing a memory into a number of partitions; and assigning a partition to a port from a pool of un-assigned partitions when required by the port, the pool of un-assigned partitions comprising of un-assigned partitions from a first group of partitions and un-assigned partitions from a second group of partitions,
wherein the un-assigned partitions from the first group of partitions are assigned to the port until a first threshold is reached,
wherein the un-assigned partitions from the second group of partitions are assigned to the port after the first threshold is reached;
wherein a second threshold is used to limit a total number of partitions assigned to the port after the first threshold is reached; and
wherein the number of partitions in the memory is at least equal to a number of ports supported.

2. The method of claim 1, further comprising grouping the number of partitions into the first group of partitions and the second group of partitions.

3. The method of claim 1, wherein when more than one partition is assigned to the port, partitions assigned to the port are linked to each other in a link list such that a last partition in the link list is a most-recently assigned partition, and a first partition in the link list is a least-recently assigned partition, the link list is used as a first-in first-out (FIFO) buffer to write and to read data.

4. The method of claim 3, wherein the data received by the port is written into the FIFO buffer in the last partition, and wherein the data is read from the FIFO buffer from the first partition.

5. The method of claim 4, wherein when reading of the data from the first partition is complete, the first partition is un-assigned from the port and returned to the pool of un-assigned partitions.

6. The method of claim 5, wherein after the reading of the data from the first partition is complete and if there is still data to be read from the FIFO buffer, the reading of the data continues from a second partition, the second partition being a next partition in the link list from the first partition.

7. The method of claim 6, wherein the reading of the data from the FIFO buffer continues until there is no data to be read from the last partition in the link list.

8. The method of claim 5, wherein after the first partition is returned to the pool of un-assigned partitions, it becomes a next un-assigned partition from the pool to be assigned.

9. The method of claim 1, wherein the port requires a partition when it receives data.

10. The method of claim 1, wherein when the port receives no data, no partition is assigned to the port.

11. The method of claim 1, wherein a minimum number of partitions from the first group of partitions is assigned to the port whether or not it receives data.

12. An article of manufacture, comprising:
a machine-accessible medium including data that, when accessed by a machine, cause the machine to performs operations comprising:
dividing a memory into a number of partitions;
grouping the number of partitions into a first group of partitions and a second group of partitions;
assigning a partition to a port from the first group of partitions until a first threshold is reached;
when necessary assigning a partition to the port from the second group of partitions after the first threshold is reached;
wherein a second threshold is used to limit a total number of partitions assigned to the port after the first threshold is reached; and
wherein the number of partitions in the memory is at least equal to a number of ports supported.

13. The article of manufacture of claim 12, wherein un-assigned partitions from the first group of partitions and from the second group of partitions are placed in a pool of un-assigned partitions, and wherein the assigning of the partition to the port is made from the pool of un-assigned partitions.

14. The article of manufacture of claim 13, wherein when more than one partition is assigned to the port, partitions assigned to the port are linked to each other in a link list such that a last partition in the link list is a most-recently assigned partition, and a first partition in the link list is a least-recently assigned partition, the link list is used as a first-in first-out (FIFO) buffer to write and to read data.

15. The article of manufacture of claim 14, wherein data written in the last partition and is read from first partition, and wherein when reading of the data from first partition is complete, the first partition is un-assigned from the port and returned to the pool of un-assigned partitions.

16. The article of manufacture of claim 15, wherein the first partition becomes a next un-assigned partition from the pool to be assigned.

17. A system, comprising:
a memory divided into a number of partitions, the partitions grouped into a first group of partitions and a second group of partitions;
a plurality of ports coupled to the memory, each of the plurality of ports to receive data to be written into its assigned one or more partitions,
wherein the partitions are assigned from the first group of partitions until a first threshold is reached, and, after the first threshold is reached, the partitions are further assigned from the second group of partitions;
wherein in addition to the first threshold, a second threshold is used to limit a maximum number of partitions assigned to a port at any one time.

18. The system of claim 17, further comprising a plurality of controllers, each of the controllers associated with each of the ports, wherein each controller is to write data received by the port to the one or more partitions assigned to the port.

19. The system of claim 18, wherein the one or more partitions assigned to the port are used as a first-in first-out (FIFO) buffer, and wherein the controller reads data from the FIFO buffer from a least-recently assigned partition and writes data to the FIFO buffer in a most-recently assigned partition.

20. The system of claim 19, wherein when the controller completes reading data from a partition, that partition is un-assigned from the port.

21. The system of claim 20, wherein the partition whose data has been completely read by the controller is further returned to one of the first group and the second group.

22. The system of claim 20, wherein the partition that is un-assigned from the port becomes a next partition to be assigned.

23. The system of claim 17, wherein the memory is divided into more partitions than ports.

* * * * *